United States Patent [19]

Ciolli

[11] Patent Number: 5,135,086

[45] Date of Patent: Aug. 4, 1992

[54] ASSEMBLY TOOL WITH RAPID RELEASE ELECTROMAGNETIC CLUTCH

[75] Inventor: Donald A. Ciolli, University Heights, Ohio

[73] Assignee: Star Precision Tools, Inc., Warrensville Heights, Ohio

[21] Appl. No.: 790,551

[22] Filed: Nov. 12, 1991

Related U.S. Application Data

[63] Continuation of Ser. No. 568,910, Aug. 17, 1990, abandoned.

[51] Int. Cl.$^5$ .............................................. F16D 47/04
[52] U.S. Cl. ....................... 192/41 S; 192/33 C; 192/43; 192/48.3; 192/81 C; 192/84 T; 475/292
[58] Field of Search ............... 192/81 C, 84 T, 48.2, 192/48.3, 26, 33 C, 35, 36, 37, 43, 41 R, 41 S; 475/292, 318

[56] References Cited

U.S. PATENT DOCUMENTS

| | | | |
|---|---|---|---|
| 3,302,762 | 2/1967 | Conlon | 192/81 C |
| 3,642,106 | 2/1972 | Baer | 192/70 |
| 3,926,286 | 12/1975 | Johnson | 192/41 S |
| 3,974,884 | 8/1976 | Gidlund | 173/12 |
| 4,030,584 | 6/1977 | Lowery et al. | 192/84 T |
| 4,159,048 | 6/1979 | Baxter et al. | 192/12 BA |
| 4,321,992 | 3/1982 | Gallo | 192/81 C |
| 4,372,432 | 2/1983 | Waine et al. | 192/43 X |
| 4,427,100 | 1/1984 | Rude et al. | 192/43 |
| 4,440,280 | 4/1984 | Hagihara | 192/36 |
| 4,460,076 | 7/1984 | Yamada | 192/35 |
| 4,465,171 | 8/1984 | Koyama | 192/81 C |
| 4,466,522 | 8/1984 | Shibuya | 192/36 |
| 4,527,683 | 7/1985 | Mathews | 192/111 A |
| 4,610,339 | 9/1986 | Ciolli | 192/48.92 |
| 4,638,899 | 1/1987 | Kossett | 192/81 C |
| 4,674,612 | 6/1987 | Ogura | 192/81 C X |
| 4,846,324 | 7/1989 | Ohsawa | 192/81 C X |

OTHER PUBLICATIONS

PSI Data Bulletin 873 of Warner Electric Brake and Clutch Company, p. 46 of the Sep. 6, 1984 issue of *Machine Design*.

Primary Examiner—Rodney H. Bonck
Assistant Examiner—Andrea Pitts
Attorney, Agent, or Firm—Willian Brinks Olds Hofer Gilson & Lione

[57] ABSTRACT

The assembly tool comprising an electrically operated clutch assembly and achieves rapid termination of energy throughput to provide accurate torque delivery for fastener tightening and similar applications. The clutch assembly includes a pair of equal diameter, axially aligned input and output hubs having a wrap-spring disposed thereabout. One end of the wrap-spring is coupled to the input hub and the other is coupled to a control annulus disposed concentrically and freely rotatably about the output hub. An electromagnet also concentrically disposed about the output hub is activated to couple the control annulus to the output hub. A resulting drag on the wrap-spring tightens it about the output hub and power is transmitted. Deactivation of the electromagnet provides rapid release of the wrap-spring and termination of power throughput. A one way (overrunning) clutch couples the hubs when power is applied in the opposite direction to, for example, facilitate removal of fasteners.

16 Claims, 2 Drawing Sheets

ASSEMBLY TOOL WITH RAPID RELEASE ELECTROMAGNETIC CLUTCH

CROSS REFERENCE TO COPENDING APPLICATION

This patent application is a continuation of application Ser. No. 07/468,910, filed Aug. 17, 1990, now abandoned.

BACKGROUND OF THE INVENTION

The invention relates generally to wrap-spring clutches and more specifically to a wrap-spring clutch activated by an electromagnet which provides rapid termination of energy throughput.

Electrically and pneumatically powered assembly tools have been utilized for decades on assembly lines. They have greatly assisted productivity where repetitive tightening of fasteners and similar assembly steps are involved. The reduction in worker fatigue, the relative accuracy of torque application and simplicity of operation have all contributed to their acceptance.

As demands for increased production and improved product quality have escalated, however, the operating requirements of such assembly tools have become increasingly sophisticated.

The most common control problem, then and now, of such tools relates to the attainment of proper final torque on a fastener. Too little torque results in an insufficiently secure fastener which may either be obviously loose and require subsequent manual tightening or be not so obviously loose, go unnoticed and loosen in service. Fasteners which have been excessively tightened are a problem of equal magnitude and are equally unacceptable. Over tightening may strain and deform a component or, more commonly, strip the threads and result in a fastener which does little more than occupy the apertures in which it resides.

These and similar torque control problems have resulted in significant effort directed to achieving proper torquing of fasteners. In conventional tools, a variable related to the tool output torque is monitored and when it reaches a desired level, motor power is terminated. In a pneumatic tool, this is generally achieved by closing a valve to shut off air supply to the pneumatic motor whereas in an electric tool a switch is opened to terminate the power flow to the motor. In a pneumatic tool, the monitored variable may be back pressure whereas in an electric tool the variable may be current draw.

For purposes of explanation, if it is assumed that the tool is adjusted to terminate drive energy when the proper torque level is achieved, it will be determined that in both configurations, the inertia of the motor and of any associated speed reduction assembly will cause the tool to overshoot the desired torque level and over tighten the fastener. A rather obvious solution to this problem presents itself: adjust the torque sensor and controller to an artificially low setting so that the torque overshoot of the tool achieves the desired fastener torque level. This solution, itself, creates another difficulty by ignoring another fastener tightening variable.

Fasteners and the components they couple may be characterized as hard or soft depending upon the slope of the torque increase per fastener rotation (or time) occurring while the fastener is tightened. In a hard joint, the torque increases rapidly as the fastener is tightened, a situation encountered when coupling very rigid, noncompressible members. Conversely, a soft joint, that is, one in which the fastener torque increases relatively slowly as the fastener is tightened, is common when one or both of the coupled members are relatively soft and elastic. In the case of a hard joint, setting the torque shut off point at an artificially low level will typically not achieve the desired result because the applied torque will increase with such rapidity that the torque sensor cannot respond rapidly enough to terminate torque application. An over tightened fastener will result. On the other hand, the tightening of a soft joint and the accompanying slow rise in applied fastener torque will result in an under tightened joint due to the anticipatory shut off of the tool. In effect, the solution of lowering the torque shutoff threshold causes the tightening process to be sensitive to the "hardness" of the joint.

Another solution is to simply operate the tool in a relatively slow manner to reduce its motor and drive train momentum and thus torque overshoot. The accompanying increase in assembly time is, however, generally unacceptable.

It is thus apparent that an electrically or pneumatically powered assembly tool wherein the applied torque is monitored, the actual, desired torque value is that value utilized to shut off the tool and the torque overshoot caused by motor and gear train momentum is minimized is desirable. The present invention is directed to just such goals.

SUMMARY OF THE INVENTION

An electrically or pneumatically powered assembly tool includes an electrically operated clutch assembly. The clutch assembly achieves rapid termination of energy throughout to provide accurate torque delivery for fastener tightening and similar assembly applications. The clutch assembly includes a pair of equal diameter, axially aligned input and output hubs having a wrap-spring disposed thereabout. One end of the wrap-spring is coupled to the input hub and the other is coupled to a control annulus disposed concentrically and freely rotatably about the output hub. An electromagnet also concentrically disposed about the output hub is activated to couple the control annulus to the output hub. The resulting drag from the annulus causes the wrap-spring to tighten about the output hub and power is transmitted. Deactivation of the electromagnet provides rapid release of the clutch annulus which causes release of the wrap-spring and termination of power throughput. A one-way (overrunning) clutch couples the hubs when power is applied in the opposite direction to, for example, facilitate removal of fasteners.

It is therefore an object of the present invention to provide a clutch assembly for use in pneumatic and electric assembly tools which provides carefully controlled drive torque to secure fasteners.

It is a further object of the present invention to provide an electromagnetically activated wrap-spring clutch assembly capable of rapid declutching.

It is a still further object of the present invention to provide an electromagnetically activated wrap-spring clutch assembly which provides improved torque control in pneumatic and electrically driven assembly tools.

It is a still further object of the present invention to provide an electromagnetically activated wrap-spring clutch assembly for use in assembly tools which provides greatly improved torque application consistency.

It is a still further object of the present invention to provide an electromagnetically activated wrap-spring clutch assembly for use in pneumatically and electrically powered assembly tools for use with associated control equipment.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 3 is an exploded perspective view illustrating the components of the electromagnetic wrap-spring clutch assembly of the present invention.

DESCRIPTION OF THE PREFERRED EMBODIMENT

Figure 1:
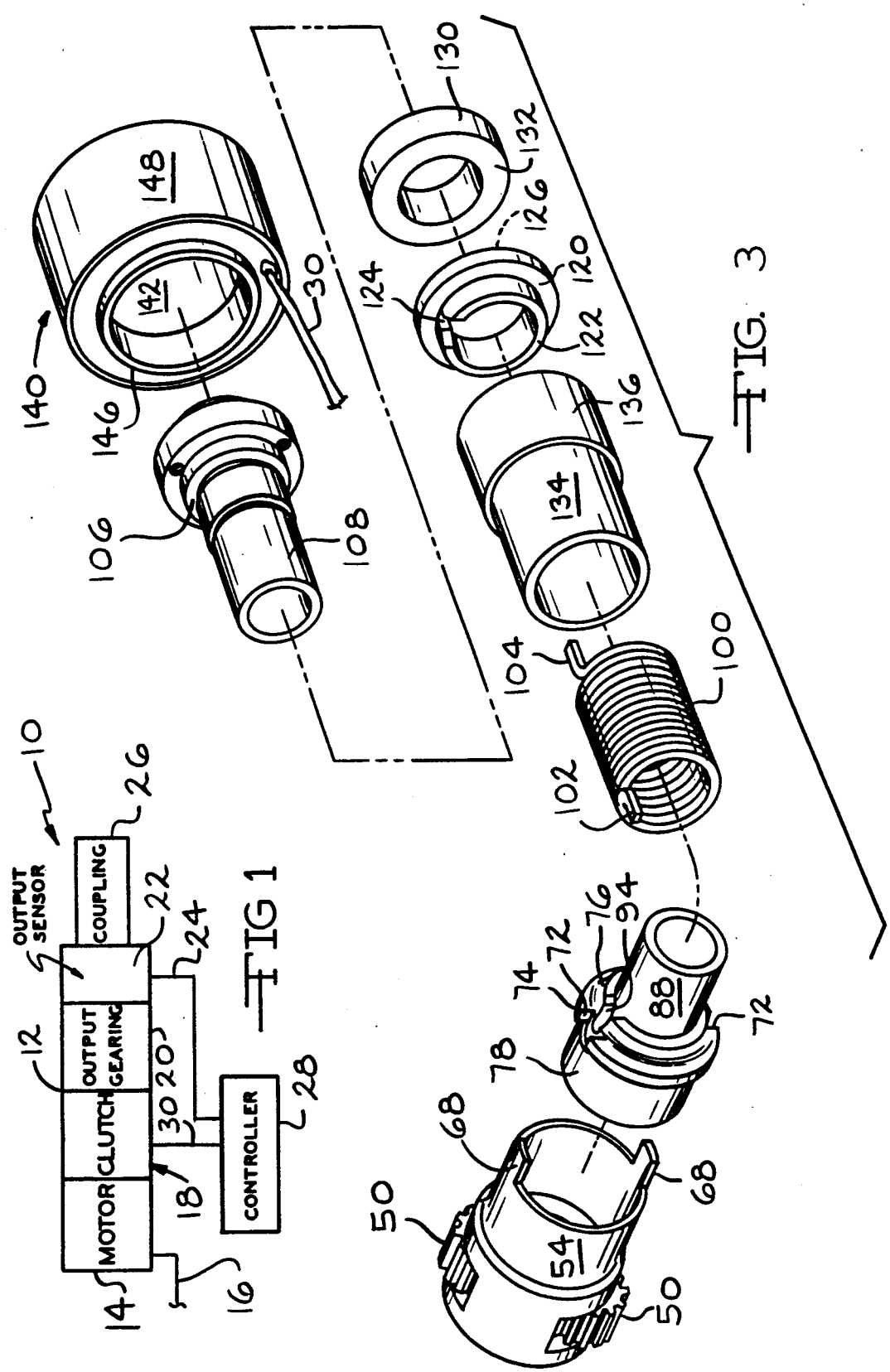
FIG. 1 is a diagrammatic view of the pneumatic or electrically powered assembly tool incorporating the present invention.

Referring now to FIG. 1, a diagrammatic view of an assembly tool incorporating the present invention is illustrated and generally designated by the reference numeral 10. The assembly tool 10 includes a generally elongated, cylindrical housing 12 which receives and protects components of the tool 10. These components include a drive motor 14 which may be either pneumatically or electrically powered. The drive motor 14 receives energy through a line 16. The housing 12 also receives and protects an electromagnetic clutch assembly 18 which will be fully described subsequently. The assembly tool 10 further includes a speed reducer 20 which may be a planetary configuration or other gear type speed reducer suited to the operating speeds and torque requirements of assembly tools. The tool 10 also includes a torque sensor 22 which may be a piezo or strain gauge type device capable of sensing the torque applied by the tool 10 to a fastener (not illustrated) and providing an output signal in a line 24. Finally, the tool includes an output fitting 26 such as a socket, screwdriver blade or similar device for coupling the output of the assembly tool 10 to a fastener.

The signal from the torque sensor 22 in the line 24 is provided to a controller 28 wherein it is utilized to program and control the operation of the assembly tool 10. Typically, when a desired torque application level is reached, the controller 28 ceases to provide a signal in the line 30 which causes the electromagnetic clutch assembly 18 to disengage, thereby terminating the application of tightening torque to the fastener by the assembly tool 10 as will be more fully described subsequently.

Figure 2:
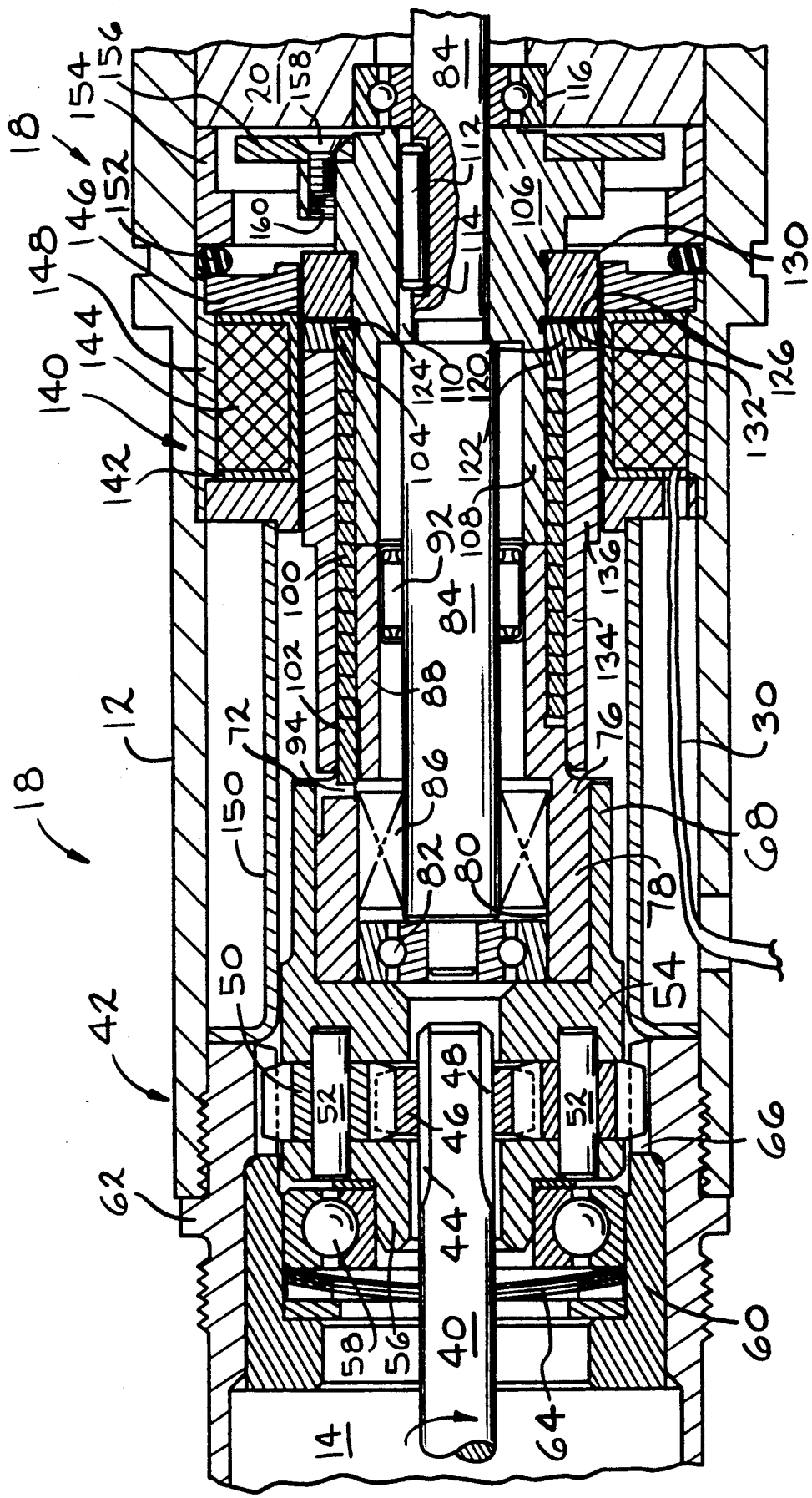
FIG. 2 is a full, sectional view of a portion of a pneumatically or electrically powered assembly tool incorporating the present invention.

Referring now to FIGS. 2 and 3, the electromagnetic clutch assembly 18 according to the present invention is illustrated and includes an input shaft 40 which accepts the output from the drive motor 14 and couples it to a planetary gear speed reduction assembly 42 of the electromagnetic clutch assembly 18. In a conventional assembly tool 10, the input shaft rotates in accordance with the arrow appearing in FIG. 2, i.e., clockwise when viewed from the left of FIG. 2. As such, the input shaft 40 includes external splines 44 which axially receive an input or sun gear 46. The sun gear 46 includes complementary internal splines 48. The sun gear 46 meshes with a plurality, preferably three, planet gears 50 which are rotatably disposed on a like plurality of stub shafts 52. The stub shafts 52 are received within a planet carrier 54. The planet carrier 54 defines a neck region 56 which is received within an anti-friction bearing such as a ball bearing assembly 58. The ball bearing assembly 58 is, in turn, supported within a static sleeve or annular insert 60 received within a housing member 62. The ball bearing assembly 58 is maintained in axial position by a plurality of Belleville springs 64.

The planet gears 50 engage the teeth of a ring gear 66 disposed on the inner surface of the housing member 62. The planetary carrier 54 also defines a pair of axially extending lugs 68. The planetary assembly 42 thus functions as a speed reducing assembly, reducing the rotational speed of the input shaft 40 and providing such reduced speed and increased torque to the planet carrier 54 and associated components.

The planet carrier 54 and specifically the lugs 68 are received within complementarily sized, axially oriented notches 72 in a radially extending shoulder 74 disposed generally axially medially on an input hub 76. One end of the input hub 76 defines a larger diameter hollow cylinder 78 which is received within the planet carrier 54. The hollow cylinder 78 defines a cylindrical inner surface 80. Seated against the inner surface 80 of the larger diameter cylinder 78 is an anti-friction bearing such as a ball bearing assembly 82. The ball bearing assembly 82 receives and rotatably supports an output shaft 84.

Also seated between the inner surface 80 of the cylinder 78 and the output shaft 84 is a one-way or overrunning clutch assembly 86. The overrunning clutch assembly 86 couples the input hub 76 to the output shaft 84 upon relative rotation between these components in one direction and permits free relative rotation between these components in the opposite direction. As noted, the input shaft 40 will rotate clockwise as viewed from the left end in FIG. 2 and as marked by the arrow. Accordingly, the input hub 76 will rotate clockwise and the clutch assembly 86 will free wheel. When the input shaft 40 and the input hub 76 rotate counter-clockwise as they would when a fastener is being removed, the clutch assembly 86 locks the input hub 76 to the output shaft 84. The other end of the input hub 76 defines a smaller diameter cylindrical barrel 88. Concentrically and internally disposed between the inside surface of the cylindrical barrel 88 and the output shaft 84 is a roller bearing assembly 92 which stabilizes and rotatably supports the input hub 76 generally and the adjacent cylindrical barrel 88 specifically. The input hub 76 also defines an axially extending notch 94.

A wrap-spring 100 includes a first axially extending tang 102 which is received within the notch 94 of the input hub 76 and thereby couples one end of the wrap-spring 100 to the input hub 76. With the drive motor 14 providing clockwise rotation to the input shaft 40 when viewed from the left of FIG. 2 (and as illustrated by the arrow appearing therein) the wrap-spring 100 is of left-hand sense. The wrap-spring 100 also includes a second axially extending tang 104 at the end opposite the tang 102. The coils of the wrap-spring 100 adjacent the tang 102 are loosely received about the cylindrical barrel 88 of the input hub 76.

Axially aligned with the input hub 76 is an output hub 106 which includes a cylindrical barrel 108 having an outside diameter equal to the outside diameter of the cylindrical barrel 88 of the input hub 76 and disposed in abutting relationship thereto. The remaining coils of the wrap-spring 100 are similarly loosely disposed about the cylindrical barrel 108 of the output hub 106. The output hub 106 includes a keyway 110 which partially receives a pin or circular key 112 which is also partially received within a keyway 114 formed in the output shaft 84. The output hub 106 is thus coupled to and secured for rotation with the output shaft 84 by the key 112. The output shaft 84 is supported for rotation by an anti-friction bearing such as the ball bearing assembly 116 which is received by the housing of the speed reducer 20.

Freely rotatably received upon the cylindrical barrel 108 of the output hub 106 is a clutch annulus 120 having an axially extending neck 122 which defines an axially extending slot 124. The axially extending slot 124 receives and engages the tang 104 of the wrap-spring 100. The clutch annulus 120 also defines a radially extending frictional clutch surface 126. An annular clutch core 130 is internally sized to define an interference fit with and is securely received upon the output hub 106 in juxtaposition with the clutch annulus 120. The annular clutch core 130 likewise defines a radially extending frictional clutch surface 132 arranged in facing relationship with the clutch surface 126 of the clutch annulus 120.

Extending from the input hub 76 to the clutch annulus 120 and loosely disposed about the wrap-spring 100 is a stepped spring sleeve 134 having regions 134a and 134b, the former having a greater wall thickness. Slidably mounted on region 134b is a sleeve 136 having a length a couple of thousandths shorter than region 134b.

Disposed generally adjacent the region 134b of the spring sleeve 134, the clutch annulus 120 and the annular clutch core 130 is an electromagnet assembly 140. The electromagnet assembly 140 includes a bobbin 142 upon which is wound a magnet coil 144 of conventional copper magnet wire. The leads from the magnet coil 144 define the control line 30 coupled to the control unit 28 as seen in FIG. 1. Adjacent opposed radially extending faces of the bobbin 142 are a pair of symmetrically disposed stepped annular pole pieces 146. The pole pieces 146 are ferrous metal and function in the magnetic circuit of the magnet coil 144. The magnetic circuit also includes the thicker region 134a of the spring sleeve 134, the clutch annulus 120 and the annular clutch core 130.

Finally, the electromagnetic assembly 140 includes an annular shell or sleeve 148. The sleeve 148 is snugly received within a suitably sized region of the housing 12 such that it does not rotate. The electromagnetic assembly 140 is maintained in axial position by a cylindrical sleeve 150 extending from one of the pole pieces 146 toward the housing member 62. An O-ring seal 152 bears against the other pole piece 146 and is maintained in a compressed state by a sleeve 154 which in turn abuts components of the speed reducer 20.

A planar disc 156 composed of electromagnetic material is secured to the output hub 106 by suitable threaded fasteners 158 received within complementarily threaded openings 160. Disc 156 has a plurality of equiangularly spaced slots 157. In one embodiment, disc 156 has 34 such slots, or about 11° between each slot. Adjacent to disc 156 and aligned with slots 157 is mounted a sensor 159, the electric leads of which are connected to controller 28 (FIG. 1). Sensor 159 produces a train of pulses corresponding to the number of slots passing it. The gap between disc 156 and sensor 159 may be on the order of about 0.005". Sensor 159 can supply to controller 28 information on the angle between the instant the torque in the fastener being tightened reaches a given threshold to the instant when tool 10 actually shuts off. The threshold torque may be about 25% of the shut-off level. The angle between the point at which the tool reaches the threshold level and the point at which tightening is discontinued is several hundred degrees in the case of a "soft" joint (one element is rubber, for example) or is on the order of 30° in the case of a "hard" joint (metal to metal, for example).

The operation of the electromagnetic clutch assembly 18 will now be described with reference to all of the drawing figures. As noted previously, conventional rotation of the drive motor 14 is clockwise as illustrated by the rotational arrow illustrated in FIG. 2 and associated with the input shaft 40. The planetary speed reduction assembly 42 provides a first stage of speed reduction and torque increase consonant with the power output of a given drive motor 14 and the torque and power requirements of a fastener application for which the assembly tool 10 is intended. The output of the planetary gear speed reduction assembly 42 is coupled to the input hub 76 through the axially extending lugs 68 and the notches 72. The input hub 76 is, in turn, coupled to one end of the wrap-spring 100 by engagement of the first axially extending tang 102 within the notch 94. Accordingly, the wrap-spring 100 is driven by and rotates with the input hub 76.

At the end of the wrap-spring 100 opposite the tang 102 is the second axially extending tang 104 which seats within an axially extending slot 124 of the clutch annulus 120. When the magnet coil 144 is energized, the frictional clutch surface 126 of the clutch annulus 120 is drawn toward and contracts the clutch surface 132 of the annular clutch core 130. Sleeve 136 is drawn against clutch annulus 120. Free rotation of the clutch annulus 120 is thereby inhibited such that the wrap-spring 100 is wound down and tightened about the aligned surfaces of the cylindrical barrel 88 of the input hub 76 and the cylindrical barrel 108 of the output hub 106. Accordingly, power is transferred from the input hub 76 to the output hub 106. The condition will continue as long as the magnet coil 144 of the electromagnetic assembly 140 is energized. When the output sensor 22 of other control device has sensed that the instantaneous torque applied by the assembly tool 10 to a fastener has reached a predetermined level, the control terminates the flow of electrical energy to the magnet coil 144.

When the magnet coil 144 is de-energized, the clutch surface 126 of the clutch annulus 120 is released from contact with the clutch surface 132 of the clutch core 130.

The annulus 120 is therefore free to rotate and the wrap-spring 100 relaxes thereby interrupting the flow of rotational energy from the input hub 76 to the output hub 106. The rapid disconnection achieved by the wrap-spring 100 provides greatly improved uniformity of torque application to fasteners.

If its is necessary to back out a fastener with the assembly tool 10, the output direction of the drive motor 14 is reversed, reversing the direction of rotation of the input shaft 40. The input hub 76 thus rotates oppositely causing the overrunning clutch assembly 86 to couple and lock together the input hub 76 and the output shaft 84. Hence, the output shaft 84 rotates in the opposite direction. In this reverse mode of operation, it will be appreciated that components such as the wrap-spring 100, the clutch annulus 120 and the electromagnetic assembly 140 do contribute to power transfer.

The foregoing disclosure is the best mode devised by the inventor for practicing this invention. It is apparent, however, that apparatus incorporating modifications and variations will be obvious to one skilled in the art of assembly tools. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A rapid release clutch assembly comprising, in combination, drive means having a bi-directional output, a wrap-spring having a pair of ends, an input hub operably coupled to said bi-directional output, having a cylindrical barrel for receiving a first portion of said wrap-spring and means for engaging one of said pair of ends of said wrap-spring, an output hub having a cylindrical barrel for receiving a second portion of said wrap-spring, an output shaft coupled to said output hub for rotation therewith and a one way clutch operably disposed between said output shaft and said input hub, a clutch collar having means for engaging the other of said pair of ends of said wrap-spring, and means for selectively coupling said clutch collar to said output hub, whereby rotation of said drive means output in a first direction and activation of said selectively coupling means rotates said output hub in said first direction and rotation of said drive means output in a second direction rotates said output hub in said second direction.

2. The rapid release clutch assembly of claim 1, wherein said input hub, said output hub and said clutch collar define coincident axes.

3. The rapid release clutch assembly of claim 1, further comprising at least one bearing means disposed between said output shaft and said input hub.

4. The rapid release clutch assembly of claim 1, further comprising a frictional face on said output hub and an opposed frictional face on said clutch collar and electromagnet means for urging said frictional faces together when energized.

5. The rapid release clutch assembly of claim 1, wherein said wrap-spring is of left-hand sense.

6. A electromagnetic clutch assembly for use in bi-directional power transmission drive trains comprising, in combination, a bi-directional drive motor, a wrap-spring having a pair of ends, an input hub defining an axis and driven by said drive motor, said input hub having a first cylindrical surface disposed about said axis for receiving a first portion of said wrap-spring and means for engaging one of said pair of ends of said wrap-spring, an output hub having a second cylindrical surface for receiving a second portion of said wrap-spring, said second cylindrical surface disposed about said axis, an output shaft coupled to said output hub for rotation therewith, a one way clutch operably disposed between said output shaft and said input hub, a clutch member disposed about said axis and having means for engaging the other of said pair of ends of said wrap-spring and, electromagnetic means for selectively coupling said clutch member to said output hub, whereby activation of said electromagnetic means when said input hub is rotating in a first direction wraps said wrap-spring about said hubs and couples said input hub to said output hub and rotation of said input hub in a second direction couples said input hub to said output shaft.

7. The electromagnetic clutch assembly of claim 6, further comprising at least one bearing means disposed between said output shaft and said input hub.

8. The electromagnetic clutch assembly of claim 6, wherein said cylindrical surface of said input hub aligns with said cylindrical surface of said output hub.

9. The electromagnetic clutch assembly of claim 6, further comprising a frictional face on said output hub and an opposed frictional face on said clutch member.

10. The electromagnetic clutch assembly of claim 6, wherein said wrap-spring is of left-hand sense.

11. An assembly tool having a rapid release clutch comprising, in combination, a bi-directional drive motor having a rotating output, a wrap-spring having a pair of ends, an input member having a cylindrical surface for receiving a portion of said wrap-spring and means for engaging one of said pair of ends of said wrap-spring, means for operably coupling said drive motor output to said input member, an output member having a cylindrical surface for receiving another portion of said wrap-spring, an output shaft coupled to said output member for rotation therewith, a clutch collar disposed adjacent said output member and having means for engaging the other of said pair of ends of said wrap-spring, means for selectively frictionally coupling said clutch collar to said output member when said drive motor is rotating in a first, forward direction and a one way clutch means operably disposed between said output shaft and said input member for coupling said input member to said output shaft when said motor is rotating in a second, reverse direction.

12. The assembly tool of claim 11, wherein said drive motor rotates clockwise and said wrap-spring is of left-hand sense.

13. The assembly tool of claim 11, wherein said means for operably coupling includes a planetary gear speed reducing assembly operably coupled to said drive motor output.

14. The assembly tool of claim 11, wherein said wrap-spring, said input member, said output member and said clutch collar are disposed about a common axis.

15. The assembly tool of claim 11, wherein said means for frictionally coupling includes an electromagnet.

16. The assembly tool of claim 11, wherein said clutch collar and said output hub define facing frictional surfaces.

* * * * *